United States Patent [19]

Hara et al.

[11] Patent Number: 4,818,983

[45] Date of Patent: Apr. 4, 1989

[54] OPTICAL IMAGE GENERATOR HAVING A SPATIAL LIGHT MODULATOR AND A DISPLAY DEVICE

[75] Inventors: Tsutomu Hara; Yoshiji Suzuki; Naohisa Mukouzaka, all of Hamamatsu, Japan

[73] Assignee: Hamamatsu Photonics Kabushiki Kaisha, Hamamatsu, Japan

[21] Appl. No.: 894,014

[22] Filed: Aug. 7, 1986

[30] Foreign Application Priority Data

Aug. 20, 1985 [JP] Japan ................... 60-182796
Aug. 20, 1985 [JP] Japan ................... 60-182797

[51] Int. Cl.$^4$ ............................ G09G 3/00
[52] U.S. Cl. .................... 340/794; 340/784; 340/713; 340/781; 350/345; 358/236
[58] Field of Search ........... 340/784, 794-797, 340/713, 714, 781; 350/345; 358/231, 236

[56] References Cited

U.S. PATENT DOCUMENTS

| | | | |
|---|---|---|---|
| 3,369,125 | 2/1968 | Dueker | 340/794 |
| 3,869,195 | 3/1975 | Aldrich et al. | 350/345 |
| 3,967,265 | 6/1976 | Jacob | 340/794 |
| 4,310,858 | 1/1982 | Hareng | 340/796 |
| 4,481,531 | 11/1984 | Warde et al. | 358/160 |
| 4,639,772 | 1/1987 | Urabe et al. | 340/713 |
| 4,668,071 | 5/1987 | Mayer | 340/794 |
| 4,678,286 | 7/1987 | Hara | 350/356 |

OTHER PUBLICATIONS

IBM Tech. Discl. Bull.; 9/75; vol. 28, No. 4; pp. 1664–1666; Light-Activated Liquid Crystal Light Valve for Projection Display.

Evert Lindberg, "Solid Crystal Modulates Light Beams", Electronics, Dec. 20, 1963, pp. 58–61.

Peter Nisenson et al., "Real Time Optical Processing with $Bi_{12}SiO_{20}$ PROM", Applied Optics, vol. 11, No. 12, Dec. 1972, pp. 2760–2767.

Primary Examiner—Marshall M. Curtis
Attorney, Agent, or Firm—Spencer & Frank

[57] ABSTRACT

An optical image generator includes a spatial light modulator and a display device. The spatial light modulator contains a material whose optical property can be changed corresponding to a change in the image pattern of an electronic charge emitted from a photocathode, so that the image pattern can be written into the material. The display device contains a two-dimensional light emitting diode (LED) or a liquid crystal display of matrix type which is arranged against the photocathode of the spatial light modulator.

6 Claims, 4 Drawing Sheets

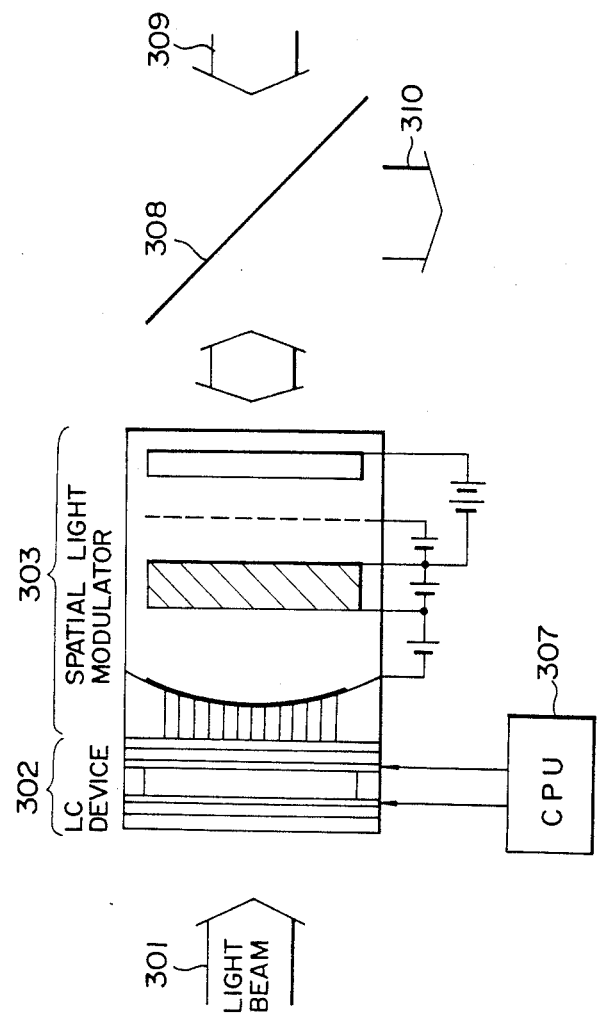

OPTICAL IMAGE GENERATOR HAVING A SPATIAL LIGHT MODULATOR AND A DISPLAY DEVICE

BACKGROUND OF THE INVENTION

This invention relates to an optical image generator having a spatial light modulator and a display device so that an image pattern created by computer and displayed on the display device in a two-dimensional manner can be used to perform parallel processing of optical information.

A spatial light modulator consists of an electron beam source and an electrooptic crystal wherein the image of electrons emitted from the electron beam source can be stored and may be changed corresponding to the optical image change. It can be used as a transducer for incoherent to coherent light conversion. It can also be used in pre-processing to determine the threshold level of data which are being input, to perform logic operations with regard to data which are being input, and to determine the contour of the optical image.

A spatial light modulator can be accessed either by means of the optical address method, whereby two-dimensional image signals can directly be written into the material, or by means of the electrically addressing method, whereby time-sequential electric signals can be written into the material.

The optical address method is used in a spatial light modulator wherein the photocathode constitutes the electron beam source, and the electrically addressing method is used in another type of spatial light modulator wherein an electron gun constitutes the electron beam source.

A spatial light modulator of the electrically addressing type, with an electron gun constituting the electron beam source, requires a set of electron lenses or electromagnetic coils for use in both focusing and deflecting the electron beam from the electron gun.

If this type of spatial light modulator is connected to a computer so as to write two-dimensional image signals calculated by computer into the spatial light modulator, the interface between the spatial light modulator and the computer may be complicated.

SUMMARY OF THE INVENTION

The first objective of the present invention is to present an optical image generator having a spatial light modulator and a display device containing a two-dimensional light emitting diode (LED) matrix array to easily write the two-dimensional image signals created by a computer on the photocathode of the spatial light modulator.

The second objective of the present invention is to present an optical image generator having a spatial light modulator and another type of display device containing a two-dimensional liquid crystal (LC) device to easily write the two-dimensional image signals created by a computer on the photocathode of the spatial light modulator.

An optical image generator built in accordance with one embodiment of the present invention includes a spatial light modulator, wherein the optical property of the material to store the electronic charge sent from the photocathode can be changed corresponding to an optical image change, and a light emitting diode array controlled by the output of a computer to cause the optical image change. The light emitting diode (LED) array is arranged against the photocathode of the spatial light modulator.

An optical image generator built in accordance with another embodiment of the present invention includes a spatial light modulator, wherein the optical property of the material to store the electronic charge sent from the photocathode can be changed corresponding to an optical image change, and a liquid crystal patterning section controlled by the output of a computer to cause the optical image change. The liquid crystal (LC) patterning section is arranged against the photocathode of the spatial light modulator.

BRIEF DESCRIPTION OF THE DRAWINGS

FIG. 6 is a cross-sectional view of a third embodiment of an optical image generator built in accordance with the present invention.

DESCRIPTION OF THE PREFERRED EMBODIMENTS

The present invention will be described hereafter in detail with reference to the attached drawings.

Figure 1:
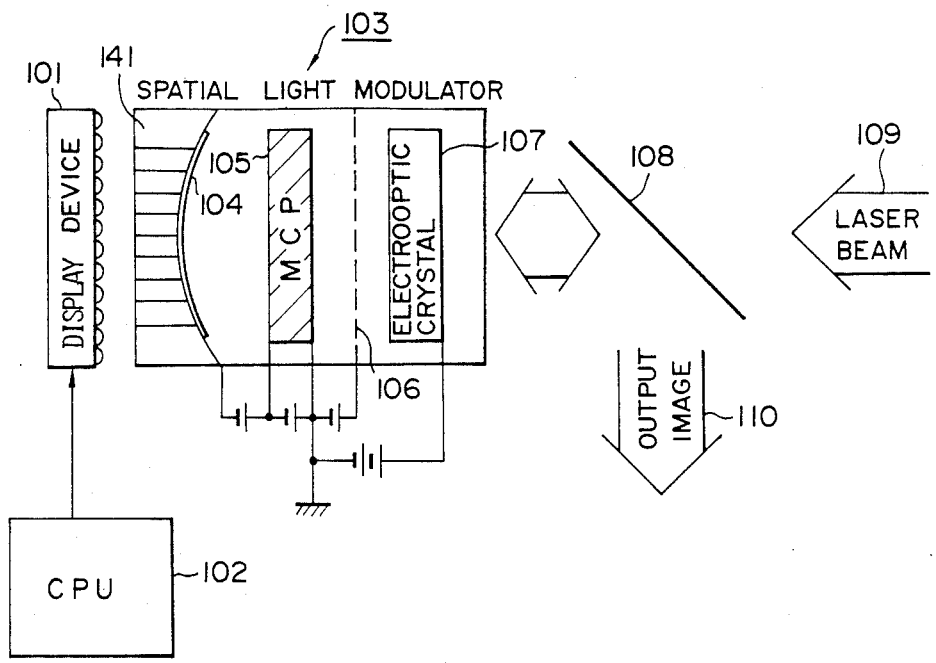
FIG. 1 is a cross-sectional view of a first embodiment of an optical image generator in accordance with the present invention, and illustrates a spatial light modulator and a display device containing an LED array controlled by the output of a computer.

FIG. 1 is a cross-sectional view of a first embodiment of an optical image generator having a spatial light modulator and a display device provided by an LED array controlled by the output of a computer in accordance with the present invention.

The incident plane of spatial light modulator 103 is made of fiber plate 141, and photocathode 104 is formed on the inner surface thereof.

The photoelectron image emitted from photocathode 104 is multiplied by microchannel plate 105, and the multiplied charges are stored on the surface of electrooptic crystal 107. Crystal 107 is made from a single-crystal plate of $LiNbO_3$.

Mesh electrode 106 is selectively used either to specify the charge storage mode or to erase the charge stored on the electrooptic crystal 107.

The refractive index of crystal 107 is spatially modulated by the electric charge image on the surface thereof.

Laser beam 109 is modulated by electrooptic crystal 107, which is exposed to laser beam 109.

After laser beam 109 is reflected from the charge storage surface of electrooptic crystal 107, it is then reflected by half-mirror 108. It then appears at the output as output image 110.

Figure 2:
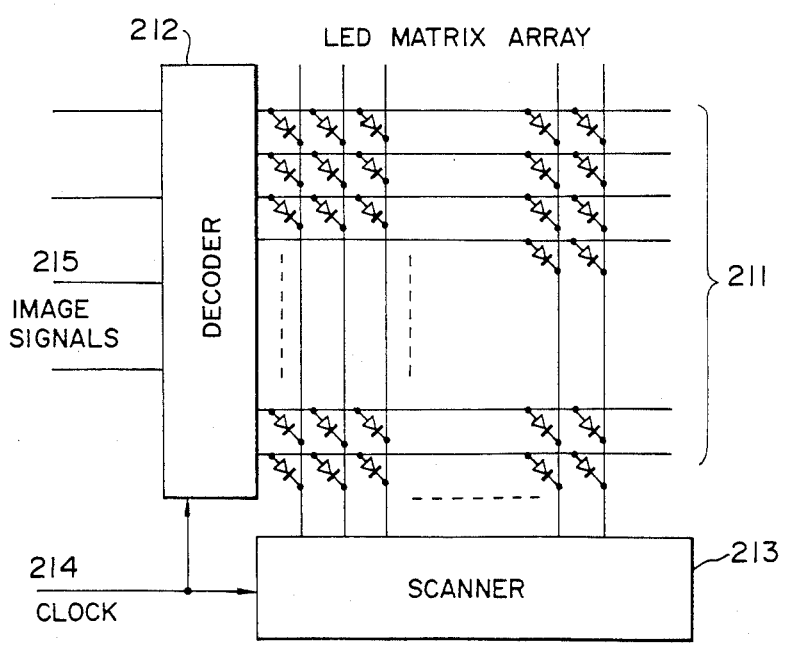
FIG. 2 is a circuit diagram of the display device shown in FIG. 1.

FIG. 2 is a circuit diagram of the display device 101, consisting of an LED array.

LED matrix array 211 of display device 101 is arranged in front of fiber plate 141. Emission of the light from each LED in LED matrix array 211 is controlled by computer 102.

Two-dimensional image signals 215, calculated by computer 102, are decoded by decoder 212.

Scanner 213 generates a scanning signal synchronized with clock signal 214.

A set of LED's can thus be driven by the corresponding input signals each time the scanning is done.

Two-dimensional image signals calculated by computer 102 can thus be written into spatial light modulator 103.

The LED's of matrix array 211 are directly coupled to fiber plate 141 in FIG. 1. However, they could be coupled to fiber plate 141 via an optical lens assembly as in the embodiment of FIG. 3. In addition, the LED's of matrix array 211 could be replaced by another type of display device, i.e., a plasma display device.

Figure 3:
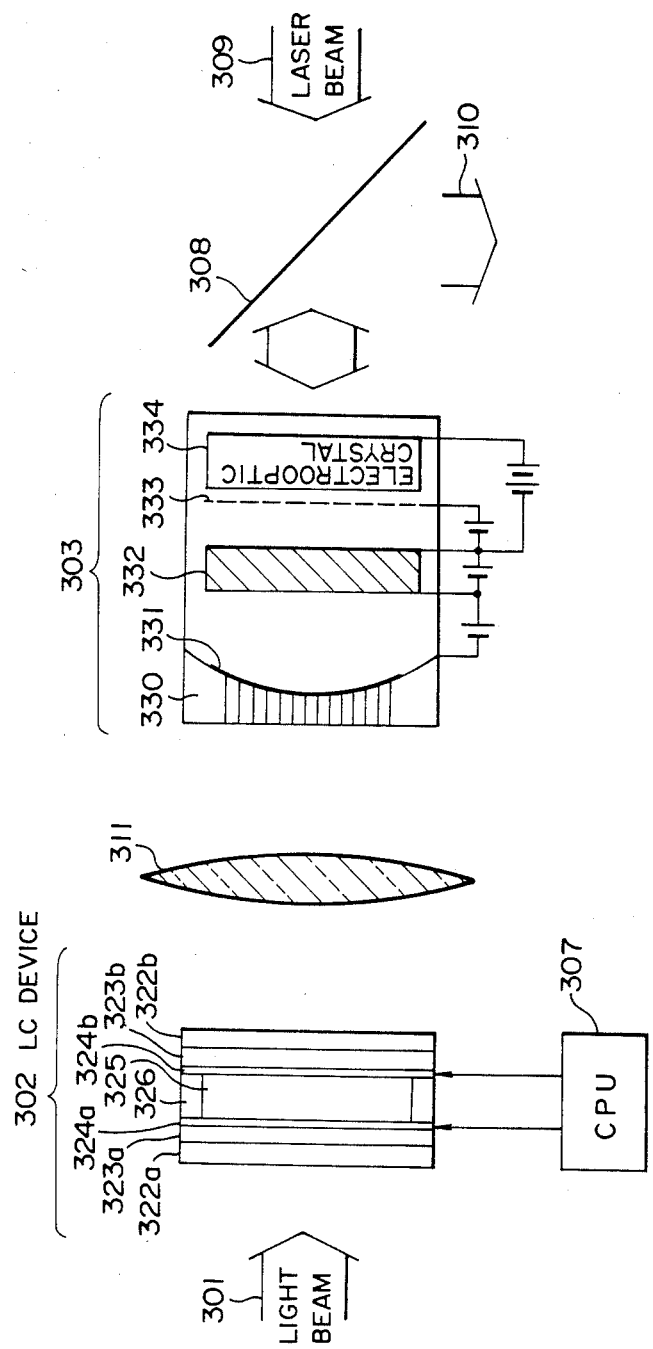
FIG. 3 is a cross-sectional view of a second embodiment of an optical image generator in accordance with the present invention, and illustrates a spatial light modulator and a display device containing an LC device controlled by the output of a computer.

FIG. 3 is a cross-sectional view of a second embodiment of an optical image generator consisting of a spatial light modulator and a display device provided by an LC device controlled by the output of a computer in accordance with the present invention.

The incident plane of the spatial light modulator 303 is made of fiber plate 330, and photocathode 331 is formed on the inner surface thereof.

The photoelectron image emitted from photocathode 331 is multiplied by microchannel plate 332, and the multiplied charges are stored on the surface of electrooptic crystal 334. Crystal 334 is made from a single-crystal plate of $LiNbO_3$. Charges are stored on the surface of the crystal.

Mesh electrode 333 is selectively used either to specify the charge storage mode or to erase the charge stored on the electrooptic crystal 334.

The refractive index of crystal 334 is spatially modulated by the electric charge image on the surface thereof.

Laser beam 309 is modulated by electrooptic crystal 334, which exposed to laser beam 309. After laser beam 309 is reflected from the charge storage surface of electrooptic crystal 334, it is then reflected by half-mirror 308. It then appears at the output as output image 310.

An LC device 302 of the matrix type is arranged in front of the spatial light modulator 303. The optical image created by LC device 302 is focused on photocathode 331 of spatial light modulator 303 by means of optical lens system 311.

Light beam 301 is spatially modulated by LC device 302. When LC device 302 is directly controlled by computer 307, operating at TTL levels, light beam 301 can be modulated spatially. During operations in this mode, the two-dimensional image signals calculated by computer 307 are written into spatial light modulator 303 and can then be converted into a two-dimensional image pattern of coherent light.

Figure 4:
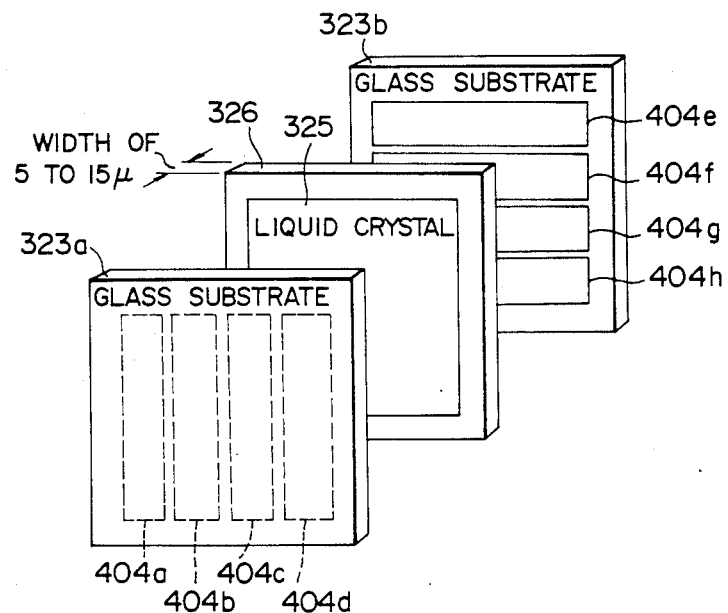
FIG. 4 is an exploded perspective view of the LC display device of the second embodiment of the present invention.

FIG. 4 is a perspective view of the extended LC device, shown in exploded form for clarity of illustration.

ITO electrodes 404a through 404d and 404e through 404h are arranged to form a grating on glass substrates 423a and 423b, respectively.

Areas for liquid crystal 325 are formed by spacing frame 326 with a width of 5 to 15$\mu$ between glass substrates 323a and 323b. Liquid crystal 325, operated in the twisted nematic mode, is sandwitched by polarizer 322a and analyzer 322b. (See FIG. 3.) An electronic switch matrix array is thus formed.

Figure 5:
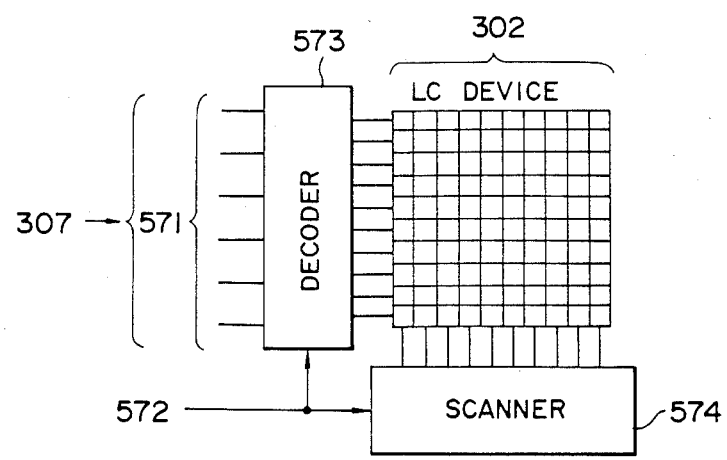
FIG. 5 is a circuit diagram of the LC display device in the second embodiment of the present invention.

FIG. 5 is a circuit diagram of a display device provided by an LC device of the matrix type.

Two-dimensional signals 571 sent from computer 307 are decoded by decoder 573. Clock signal 572 is fed to both the decoder 573 and scanner 574.

LC device 302 is thus driven by the scanner output at every scanning, synchronized with the clock signal.

LC device 302 is directly driven by a drive signal at TTL levels, and not by any high voltage signals.

FIG. 6 is a cross-sectional view of a third embodiment of an optical image generator built in accordance with the present invention. LC device 302 is directly attached to fiber plate 330. This version is a compact system wherein the lens system is eliminated to reduce the total size, and it can be operated in the same manner.

As described above, an optical image generator built in accordance with the present invention includes a spatial light modulator, wherein the optical property of a material to store an electronic charge sent from a photocathode can be changed corresponding to an optical image change, and an LED array or an LC device of the matrix type controlled by the output of a computer. The LED array or the LC device of the matrix type is arranged against the photocathode of the spatial light modulator.

Time-sequential electric signals sent from the electric computer can easily be converted into a two-dimensional image of coherent light.

Accordingly, the optical image generator of the invention can be used in an optical information processing system as a transducer for converting a sequential electric signal generated by the electric computer to a parallel coherent optical signal.

What is claimed is:

1. An optical image generator, comprising:
   a spatial light modulator, said spatial light modulator including a photocathode and a crystal material whose optical property changes with the charge thereon, which can be changed corresponding to the change in a two-dimensional image pattern impinging on the photocathode, the spatial light modulator additionally including a microchannel plate between the photocathode and the crystal material; and
   a display device, said display device including a light emitting element matrix array controlled by a computer and arranged adjacent said photocathode.

2. An optical image generator according to claim 1, wherein said light emitting element matrix array is an LED matrix array.

3. An optical image generator according to claim 1, wherein said light emitting element matrix array is a plasma display matrix array.

4. An optical image generator, comprising:
   a spatial light modulator, said spatial light modulator including a photocathode and a crystal material whose optical property changes with the charge thereon, which can be changed corresponding to the change in a two-dimensional image pattern impinging on the photocathode, the spatial light modulator additionally including a microchannel plate between the photocathode and the crystal material; and a display device, said display device including an LC device controlled by a computer and arranged adjacent said photocathode.

5. An optical image generator as claimed in claim 4, further comprising means for generating light which is projected through said LC device, and means including an optical lens and a fiber plate system for conveying the light projected through the LC device to the photocathode.

6. An optical image generator claim 4, further comprising a fiber plate, and means for generating light which is projected through said LC device, wherein said two-dimensional image pattern impinging on said photocathode is that which is projected through said LC device directly onto said photocathode and passing only through the fiber plate.

* * * * *